(12) United States Patent
Baltaxe et al.

(10) Patent No.: US 12,456,312 B1
(45) Date of Patent: Oct. 28, 2025

(54) OCCUPANCY ESTIMATION SYSTEM FOR A VEHICLE

(71) Applicant: GM Global Technology Operations LLC, Detroit, MI (US)

(72) Inventors: Michael Baltaxe, Kfar Saba (IL); Ron Hecht, Raanana (IL); Omer Tsimhoni, Bloomfield Hills, MI (US); Ariel Telpaz, Givat Haim Meuhad (IL); Gershon Celniker, Netanya (IL); Dan Levi, Ganei Tikvah (IL)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/644,979

(22) Filed: Apr. 24, 2024

(51) Int. Cl.
*G06F 3/01* (2006.01)
*G06V 20/59* (2022.01)

(52) U.S. Cl.
CPC ............ *G06V 20/593* (2022.01); *G06F 3/013* (2013.01)

(58) Field of Classification Search
CPC .......... G06F 3/012; G06F 3/013; G06F 3/015; G05B 2219/35503; G05B 2219/35145; G05B 2219/40442; G02B 27/0093; G02B 27/01; B60W 2540/225; B60K 2370/149; B60K 2370/194; B60K 2370/736; G06V 20/597; G06V 10/25; B60R 1/23; B60R 1/25; B60R 1/29
USPC ........................................................ 348/148
See application file for complete search history.

(56) References Cited

U.S. PATENT DOCUMENTS

| 2016/0291690 | A1* | 10/2016 | Thorn | G06V 40/19 |
| 2021/0012531 | A1* | 1/2021 | Ollila | G06T 7/50 |
| 2021/0243384 | A1* | 8/2021 | Ollila | G06V 20/20 |

OTHER PUBLICATIONS

Hokmabadi et al. "Probabilistic Silhouette-Based Close-Range Photogrammetry Using a Novel 3D Occupancy-Based Reconstruction" The International Archives of the Photogrammetry, Remote Sensing and Spatial Information Sciences, vol. XLIII-B2-2022 XXIV ISPRS Congress, Jun. 6-11, 2022, Nice, France, pp. 343-350.*
Nakashima et al. "Saliency-based gaze prediction based on head direction" Vision Research 117, Nov. 8, 2015, pp. 59-66.*

* cited by examiner

*Primary Examiner* — Nathnael Aynalem
(74) *Attorney, Agent, or Firm* — Honigman LLP; Matthew H. Szalach; Jonathan P. O'Brien (57) ABSTRACT

A computer-implemented method when executed by data processing hardware causes the data processing hardware to perform operations. The operations include generating, at an occupancy estimation network, an occupancy probability at one or more voxels, predicting, via a gaze prediction model, a gaze direction of a gaze prediction, and identifying, based on the predicted gaze direction, an object of interest. The operations also include generating, via an occupancy estimation application, a gaze saliency map based on the gaze direction and identified object of interest, and updating, based on the determined gaze direction and the gaze saliency map, the occupancy probability of the one or more voxels.

20 Claims, 8 Drawing Sheets

OCCUPANCY ESTIMATION SYSTEM FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to an occupancy estimation system for a vehicle based on gaze estimation.

Occupancy estimation is used to classify whether a voxel in space is occupied to generate an associated image. When an object is far away or distant relative to a vehicle, for example, the accuracy of occupancy estimation is reduced. The accuracy is affected by low camera resolution for far away objects. For example, objects at a distance are typically projected with a few pixels, which yields a poor signal-to-noise ratio. Thus, there is a need for improving the occupancy estimation for objects that are at a distance relative to vehicles and, thus, improve the quality of image resolution.

SUMMARY

In some aspects, a computer-implemented method when executed by data processing hardware causes the data processing hardware to perform operations. The operations include generating, at an occupancy estimation network, an occupancy probability at one or more voxels, tracking, via a camera system, a gaze of an occupant, identifying, based on the tracked gaze, an object of interest, and determining a gaze direction of the occupant based on one or more of the tracked gaze and the identified object of interest. The operations also include generating, via an occupancy estimation application, a gaze saliency map based on the gaze direction and identified object of interest and updating, based on the determined gaze direction and the gaze saliency map, the occupancy probability of the one or more voxels.

In some examples, the operations may include training, via a gaze prediction model, the occupancy estimation network. In other examples, identifying an object of interest may include generating, via the occupancy estimation application, a two-dimensional Gaussian function on a two-dimensional image space of the gaze saliency map. The operations may also include projecting, on the two-dimensional image space, the one or more voxels. In some instances, updating the occupancy probability may include gathering, based on the projected one or more voxels, a two-dimensional index for each projected voxel. The operations may also include applying a threshold to the updated occupancy probability. In some configurations, the gaze may include at least one of a smooth pursuit, a fixed gaze, and saccades.

In other aspects, a computer-implemented method when executed by data processing hardware causes the data processing hardware to perform operations. The operations include generating, at an occupancy estimation network, an occupancy probability at one or more voxels, predicting, via a gaze prediction model, a gaze direction of a gaze prediction, and identifying, based on the predicted gaze direction, an object of interest. The operations also include generating, via an occupancy estimation application, a gaze saliency map based on the gaze direction and identified object of interest, and updating, based on the determined gaze direction and the gaze saliency map, the occupancy probability of the one or more voxels.

In some examples, the operations may include training, via a model trainer of a gaze prediction model, the occupancy estimation network. In some implementations, identifying an object of interest may include generating, via the occupancy estimation application, a two-dimensional Gaussian function on a two-dimensional image space of the gaze saliency map. The operations may also include projecting, on the two-dimensional image space, the one or more voxels. In some instances, updating an occupancy probability may include gathering, based on the projected one or more voxels, a two-dimensional index for each projected voxel. The operations may also include applying a threshold to the updated occupancy probability.

In further aspects, an occupancy estimation system for a vehicle includes data processing hardware and memory hardware. The memory hardware stores instructions that when executed on the data processing hardware cause the data processing hardware to perform operations. The operations include generating, at an occupancy estimation network, an occupancy probability at one or more voxels, tracking, via a camera system, a gaze of an occupant, identifying, based on the tracked gaze, an object of interest, and determining a gaze direction based on one or more of the tracked gaze and the identified object of interest. The operations also include generating, via an occupancy estimation application, a gaze saliency map based on the gaze direction and identified object of interest, and updating, based on the determined gaze direction and the occupancy map, the occupancy probability of the one or more voxels.

In some examples, the operations may include training, via a gaze prediction model, the occupancy estimation network. Optionally, identifying an object of interest may include generating, via the occupancy estimation application, a two-dimensional Gaussian function on a two-dimensional image space of the gaze saliency map. The operations may also include projecting, on the two-dimensional image space, the one or more voxels. In some implementations, updating an occupancy probability may include gathering, based on the projected one or more voxels, a two-dimensional index for each projected voxel. The operations may also include applying a threshold to the updated occupancy probability. In some instances, the gaze may include at least one of a smooth pursuit, a fixed gaze, and saccades.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 1:
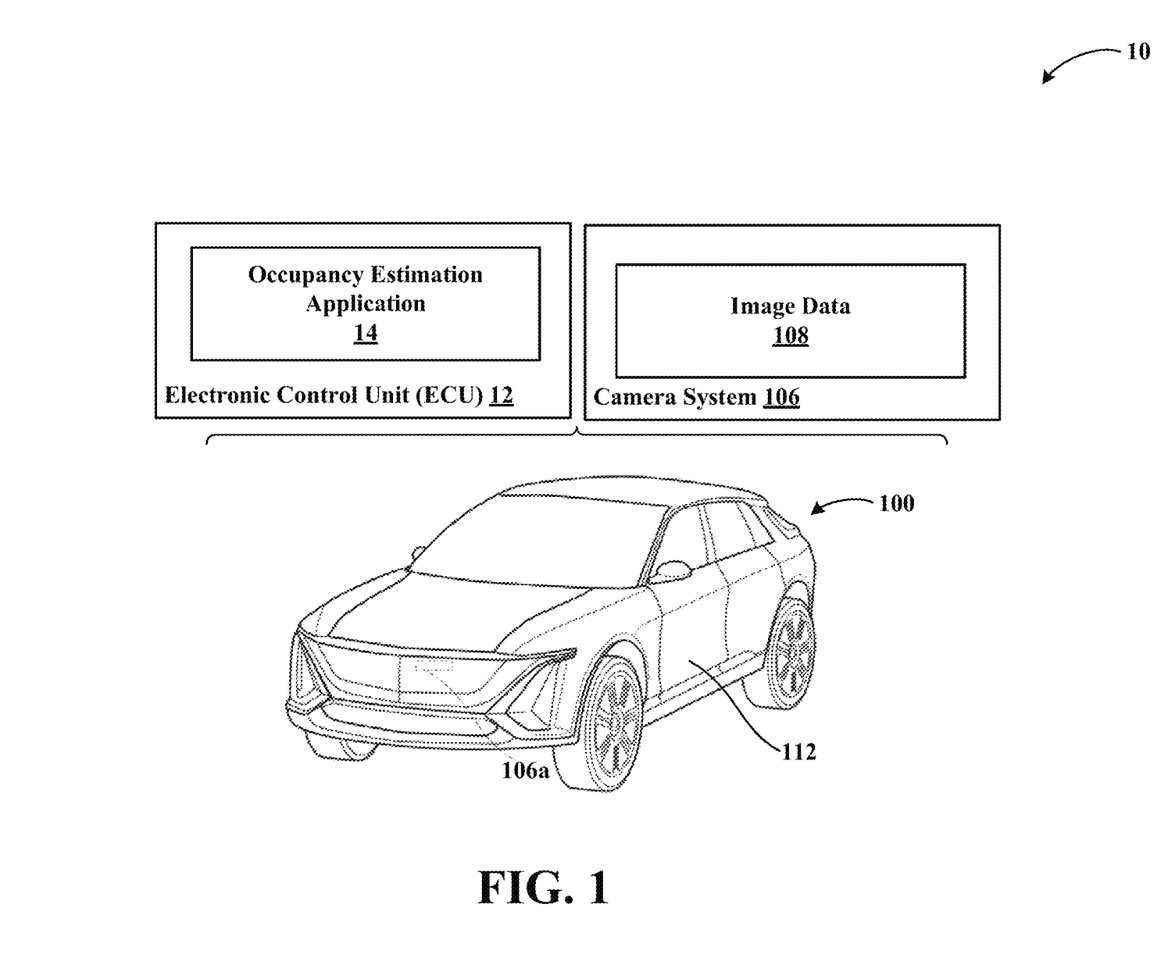
FIG. 1 is a schematic diagram of an occupancy estimation system for a vehicle according to the present disclosure.
Figure 2:
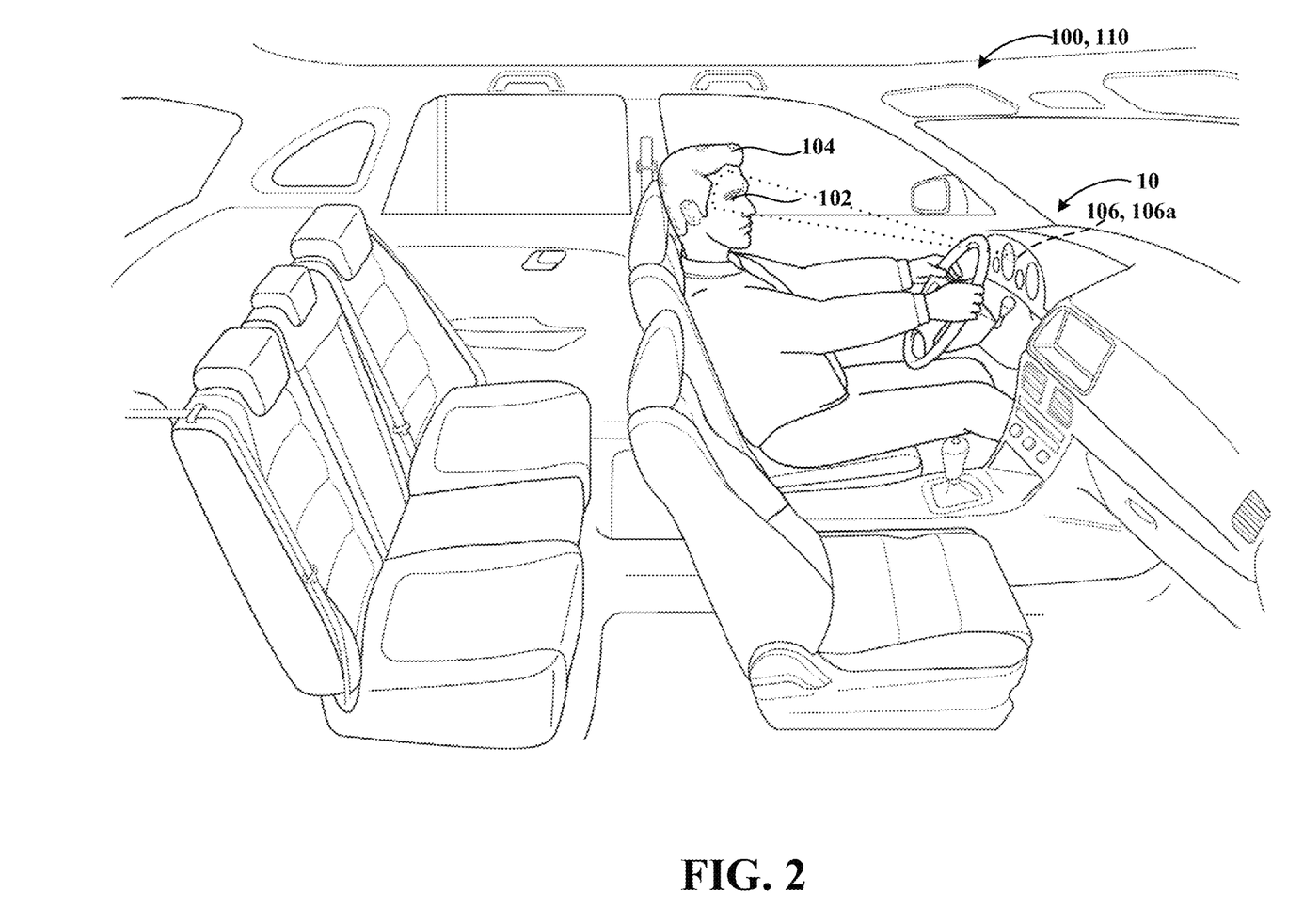
FIG. 2 is a partial interior view of a vehicle with a camera system according to the present disclosure monitoring a gaze of a driver.
Figure 3:
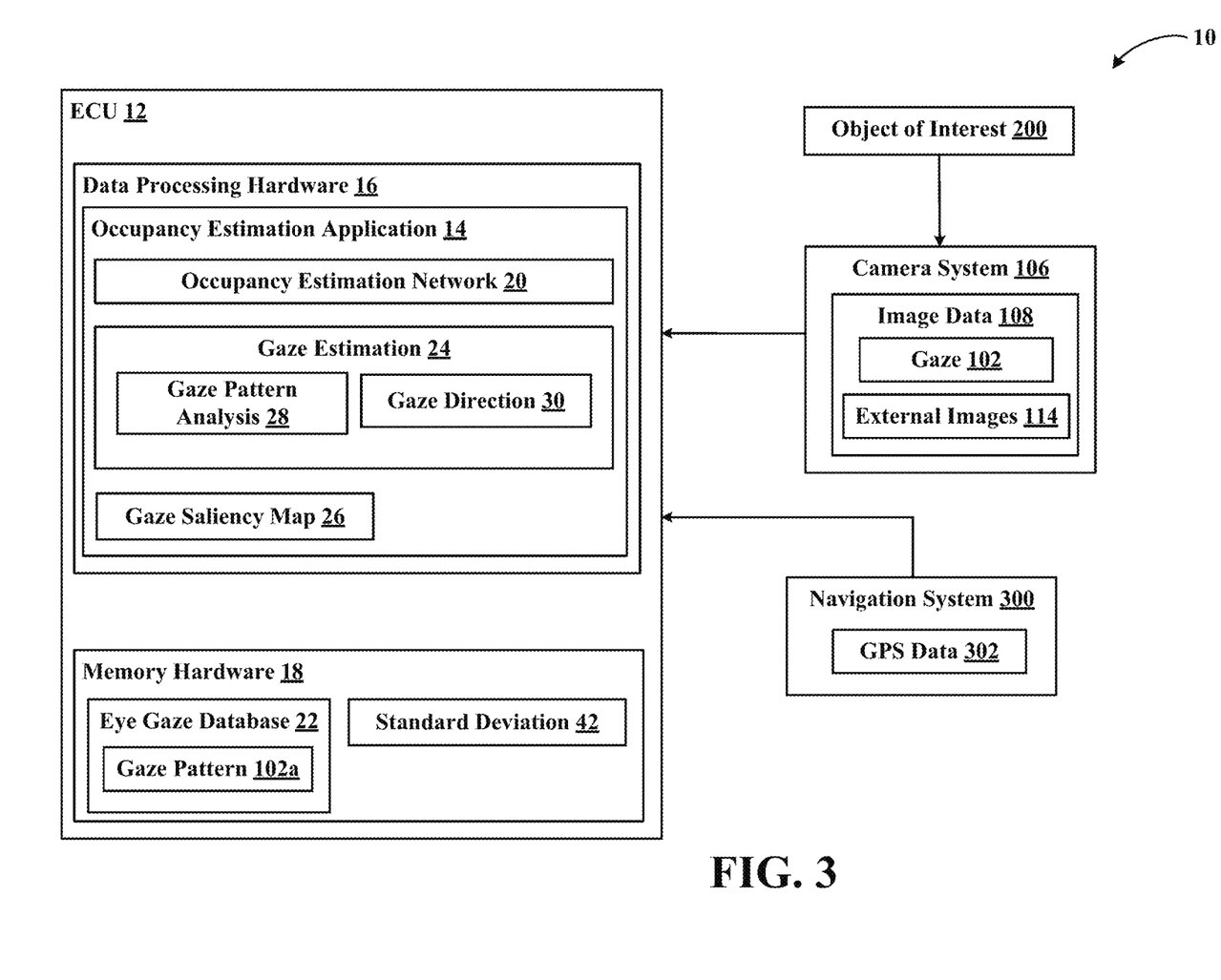
FIG. 3 is an exemplary block diagram of an occupancy estimation system according to the present disclosure.

Referring to FIGS. 1-3, an occupancy estimation system 10 is configured as part of a vehicle 100 that includes an electronic control unit (ECU) 12. The ECU 12 is configured with an occupancy estimation application 14, and the occupancy estimation system 10 is designed to estimate objects 200 exterior to the vehicle 100 based on a gaze 102 of an occupant 104 of the vehicle 100. For example, some objects 200 may be at a far distance relative to the vehicle 100, and a camera system 106 of the vehicle 100 may otherwise capture incomplete image data 108. The incomplete image data 108 may be blurry, pixelated, or otherwise unclear. The occupancy estimation system 10, thus, analyzes the gaze 102 of the occupant 104 to identify the object 200, and the occupancy estimation application 14 is utilized to more clearly identify the object 200, as described below, as an object of interest 200. Thus, gaze 102 of the occupant 104 can be utilized to improve the likelihood of relevant objects 200 (i.e., objects of interest 200) located far away from the vehicle 100.

FIG. 2 illustrates an example of the occupancy estimation system 10 capturing the gaze 102 of the occupant 104. The gaze 102 is captured as image data 108 by the camera system 106 and communicated to the ECU 12 for analysis via the occupancy estimation application 14. The camera system 106 is configured as part of the vehicle 100, such that the camera system 106 includes cameras 106a within an interior cabin 110 and along a body 112 of the vehicle 100. The cameras 106a may be configured as any practicable imager including, but not limited to, LIDAR and infrared cameras. The interior cameras 106a are configured to monitor the occupant(s) 104 to capture the gaze 102 and the exterior cameras 106a are configured to monitor an external space for potential objects of interest 200. The image data 108 thus includes the gaze 102 and external images 114 captured by the camera system 106. The external images 114 may include objects of interest 200 as well as surrounding objects that may otherwise generate noise as part of the occupancy estimation system 10. Thus, the occupancy estimation application 14 is designed to differentiate between objects of interest 200 that may be part of the external images 114 by analyzing the gaze 102, as described in more detail below.

With further reference to FIGS. 1-3, the vehicle 100 may also be equipped with a navigation system 300 that is communicatively coupled with the ECU 12 to provide Global Positioning System (GPS) data 302. The ECU 12 may utilize the GPS data 302 to inform a location of the vehicle 100, which may be utilized by the occupancy estimation application 14 when analyzing the image data 108. For example, the occupancy estimation application 14 may compare the GPS data 302 with the image data 108 received from the camera system 106 to assist in triangulating a potential object of interest 200. The GPS data 302 may be particularly advantageous in examples where the vehicle 100 is an autonomous or semi-autonomous vehicle 100, described below.

Referring now to FIGS. 2-5, the occupancy estimation application 14 is executed by data processing hardware 16 of the ECU 12. The ECU 12 also includes memory hardware 18 that is in communication with the data processing hardware 16. The memory hardware 18 stores instructions that, when executed on the data processing hardware 16, cause the data processing hardware 16 to perform operations, set forth herein. The occupancy estimation application 14 includes an occupancy estimation network 20 that may communicate with an eye gaze database 22 stored on the memory hardware 18.

The eye gaze database 22 may be populated by the image data 108 received from the camera system 106 and stored for use with a gaze estimation 24 of the occupancy estimation application 14. The eye gaze database 22 may be used in communication with the occupancy estimation network 20 and the gaze estimation 24 to generate a gaze saliency map 26. In some instances the eye gaze database 22 may be utilized for autonomous functions of the vehicle 100. For example, the vehicle 100 may be configured as an autonomous and/or semi-autonomous vehicle 100, such that the vehicle 100 may utilize the eye gaze database 22 in executing the occupancy estimation application 14 when the occupant 104 is a passenger of the vehicle 100 and the gaze 102 of the occupant 104 is not actively captured.

In this example, the gaze 102 of the occupant 104 may be different from the gaze 102 of the occupant 104 when the occupant 104 is operating the vehicle 100. Thus, the occupancy estimation application 14 may utilize the eye gaze database 22 when executing the occupancy estimation network 20 and the gaze estimation 24 to generate and update the gaze saliency map 26, described in more detail below. The eye gaze database 22 stores gaze patterns 102a as historical gaze data gathered based on the image data 108. As described herein, the occupancy estimation application 14 utilizes the gaze patterns 102a to estimate the gaze 102 in autonomous vehicle 100 examples.

The gaze 102 may include different types of eye movement. For example, the gaze 102 includes, but is not limited to, at least one of a smooth pursuit, vergence, vestibuloocular, a fixed gaze, and saccades. During the smooth pursuit and the fixed gaze, the occupant 104 is tracking the object of interest 200 and generally maintains a consistent gaze 102 in the direction of the object 200. While a constant gaze 102 may be maintained, the occupant 104 also maintains consistent gaze patterns 102a directed to the road and travel trajectory of the vehicle 100 while the gaze 102 also monitors the object 200. Comparatively, saccades correspond to rapid eye movement of the gaze 102, such that the gaze 102 of the occupant 104 may be scanning an exterior area without fixating on a particular object of interest 200. Thus, objects 200 that are deemed important typically correlate with the gaze 102 being defined as a smooth pursuit and/or fixed gaze as a result of the gaze 102 having longer and repeated fixations and pursuits.

In some instances, the fixed gaze and the smooth pursuit gazes 102 may be preceded by a saccade gaze 102, such that the saccade gaze 102 may be predictive of an object of interest 200 when followed by at least one of the smooth pursuit gaze 102 and the fixed gaze 102. With respect to the smooth pursuit gaze 102, the smooth pursuit gaze 102 indicates that one or both of the vehicle 100 and object 200 is moving. In the event of the smooth pursuit gaze 102, a gaze pattern analysis 28 may triangulate the location of the object 200 based on the location of the vehicle 100, a gaze direction 30, and other relevant GPS data 302. To capture the gaze direction 30, the gaze 102 is projected into two-dimensions, described below. Thus, the gaze pattern analysis 28 may be utilized to determine whether the gaze 102 is directed at an object 200 (i.e., an object of interest 200) and identifying a location of the object of interest 200 based, in part, on the two-dimensional gaze direction 30.

Each of the saccades, the smooth pursuit, and the fixed gaze may be classified as one of the gaze patterns 102a stored within the eye gaze database 22 of the memory hardware 18. The gaze 102 can be classified with a respective gaze pattern 102a through a time-series and/or sequence analysis executed by the gaze estimation 24 of the occupancy estimation application 14. For example, the gaze pattern analysis 28 of the gaze estimation 24 is configured to identify the gaze pattern 102a. The gaze pattern analysis 28 may include, but is not limited to, methods such as a long short-term memory (LSTM) model, Markov transition fields, and classification trees.

Referring still to FIGS. 2-5, the object of interest 200 may be identified by tracking the gaze 102 and logging the gaze patterns 102a in the eye gaze database 22. The eye gaze database 22 may record time-based categorizations of the gazes 102 to assist the gaze pattern analysis 28 to identify the respective gaze pattern 102a. For example, the time-based categorization can differentiate between each of the smooth pursuit, fixed, and saccades gazes 102. The gaze pattern 102a can further be analyzed by the occupancy estimation application 14 by assessing a direction and duration of the gaze 102. When assessing the gaze pattern 102a, the gaze estimation 24 compares the gaze direction 30 with the GPS data 302 received from the navigation system 300 by taking into account an ego movement of the vehicle 100 in order to identify a pursuit of a fixed object 200 based on a location of the vehicle 100.

Figure 4:
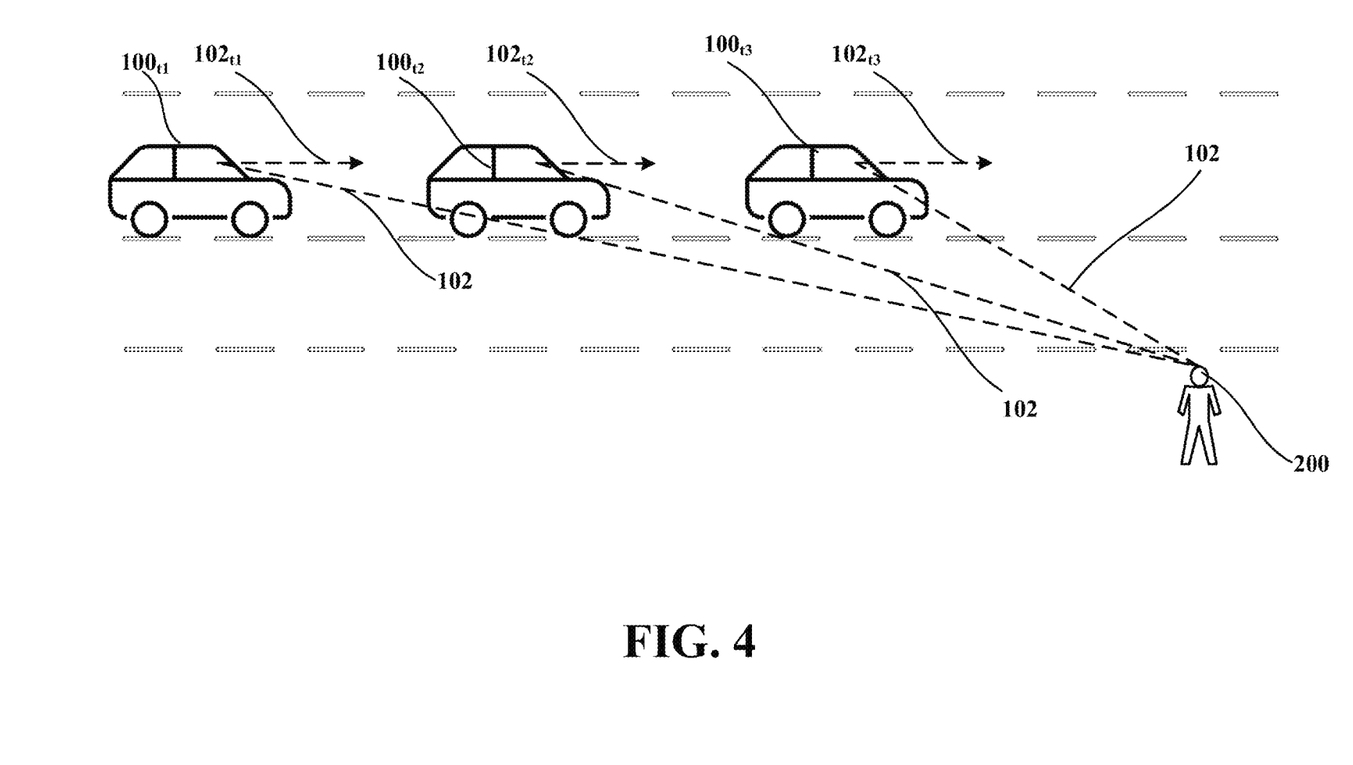
FIG. 4 is a schematic diagram of a vehicle equipped with an occupancy estimation system according to the present disclosure, the vehicle on a road and detecting objects.

FIG. 4 illustrates an example of time-based gaze 102 capture. For example, the vehicle $100_{t1}$ is illustrated at a first time point associated with a first gaze $102_{t1}$. As the vehicle 100 progresses along the road, a second gaze $102_{t2}$ is captured at a second location of the vehicle $100_{t2}$. Finally, a third gaze $102_{t3}$ is captured at yet a further location of the vehicle $100_{t3}$ associated with a third time point. The vehicle $100_{t1}$-$100_{t3}$ in this example is moving or traveling along the road while one or more objects 200 remain stationary. The gaze $102_{t1}$-$102_{t3}$ at each time point is captured and communicated with the ECU 12 for potential storage in the eye gaze database 22 and for use with the occupancy estimation application 14. While FIG. 4 is a singular example to illustrate three time points of the vehicle $100_{t1}$-$100_{t3}$, it is contemplated that there may be greater than three time points and/or less than three time points captured by the camera system 106.

With further reference to FIGS. 2-5, in some examples, the vehicle 100 may be stationary or the object 200 may be directly ahead of the vehicle. Thus, the gaze direction 30 may assist in identifying a fixation to the object 200. Fixation of the gaze 102 (i.e., a fixed gaze) indicates that there is an object of interest 200, which may trigger the gaze pattern analysis 28. The gaze pattern analysis 28 may calculate the gaze direction 30 in global coordinates to account for the ego-motion and/or movement of the object(s) 200 relative to the vehicle 100 by comparing the gaze 102 with the GPS data 302. The gaze pattern analysis 28 may subsequently assign a likely importance of the object 200 based on the duration of the gaze pattern 102a (i.e., fixed gaze or smooth pursuit), the likelihood that the occupant 104 would naturally look in the direction of the object 200, and if there was a significant gaze pattern 102a (i.e., saccade) leading to the fixation on the object 200.

For exemplary purposes, one example of gaze behavior may include a ball rolling into the road far ahead of the vehicle 100. The occupant 104 may saccade to the ball and track (i.e., pursue) movement of the ball. The gaze 102 of the occupant 104 may then saccade to areas along the road for objects related to the ball 200 and may track any objects 200 related to the ball 200. In another non-limiting example, FIG. 4 illustrates an example where the occupant 104 may have a straight, stagnant gaze 102 (i.e., long fixation) with an object 200 along the road. As the object 200 gets closer to the vehicle 100, the gaze pattern 102a may change from a stagnant gaze 102 to a tracking gaze 102.

With continued reference to FIGS. 2-5, the occupancy estimation network 20 is configured to generate a voxel grid 32 where each voxel 34, described below, is either empty or full. For example, the voxel grid 32 is binary and provides a geometry of the image data 108. The voxel grid 32 is generated based on the image data 108 received from the camera system 106. For example, the occupancy estimation network 20 receives, as an input, the image data 108 and outputs the voxel grid 32. The raw image data 108 that is transformed onto the voxel grid 32 may be unclear as to the occupancy of a given voxel 34.

Thus, the occupancy estimation network 20 is configured to generate an occupancy probability 36 at one or more voxels 34. For example, the occupancy estimation network 20 may provide the occupancy probability 36 related to the probability of each voxel 34 being occupied. The occupancy probability 36 is recorded as a score between zero (0) and one (1), where a score of 0 reflects that the voxel 34 is not occupied and a score of 1 reflects a high probability that the voxel 34 is occupied. Thus, the occupancy probability 36 pertains to the likelihood, or probability, that an object of interest 200 is occupying a given voxel 34. The occupancy probability 36 may be calculated as a measure between values or as a continuous value, reflected in the score associated with a given voxel 34. The occupancy probability 36 is used by the occupancy estimation application 14 in combination with the gaze estimation 24 to track whether an object of interest 200 is identified.

The gaze direction 30 is projected and transformed into a two-dimensional (2D) image space 38. Additionally, a 2D Gaussian function 40 is defined in the same 2D space, centered around the direction of the gaze and having a standard deviation 42 stored in the memory hardware 18. The voxels 34 are data points on a three-dimensional (3D) grid (i.e., the voxel grid 32). These voxels 34 are projected onto the 2D image space 38 defining a correlation between a 3D point and the 2D space. The Gaussian function 40 is used to re-weight the occupancy probability 36 of each voxel 34, according to its projection in the common 2D space.

For example, the 2D Gaussian function 40 is created on the 2D image space 38 in response to the identification of an object of interest 200. The object of interest 200 is identified based on the camera system 106 tracking the gaze 102 of the occupant 104 and the captured external images 110. The 2D Gaussian function 40 is defined for respective pixels 44, which correspond to the projected voxels 34. For example, the voxels 34 are projected on the 2D image space 38 to have a corresponding pixel 44 on the 2D image space 38. The occupancy estimation application 14 utilizes the pixels 44, the 2D Gaussian function 40, the gaze estimation 24, and the 2D image space 38 to update the gaze saliency map 26 and, as a result, the occupancy probability 36. The pixels 44 may be categorized by a 2D index 46 of the 2D image space 38. The 2D index 46 is associated with each voxel 34, such that updating the occupancy probability 36 includes gathering, based on the projected voxels 34 on the 2D image space 38, the 2D index 46 for each voxel 34.

By way of example, not limitation, the occupancy estimation application 14 may use the measured gaze direction 30 and project the gaze direction 30 into the 2D image space 38. The occupancy estimation application 14 may subsequently define the 2D Gaussian function 40 in the 2D image space 38 and present a location with a high probability that the gaze 102 of the occupant 104 corresponds to a location of the object 200. So, the 2D Gaussian function 40 may be thus centered around the gaze direction 30, and the occupancy estimation application 14 retrieves the associated standard deviation 42 of the 2D Gaussian function 40.

The result is the occupancy estimation application 14 determining whether there is a high probability of the object 200 within a given voxel 34. For each individual voxel 34, the occupancy estimation application 14 adapts the occupancy probability 36 of the voxel 34 being occupied based on the 2D Gaussian function 40. For example, if a first voxel 34 is projected to a first pixel 44, then the 2D Gaussian function 40 will update the occupancy probability 36 of the first voxel 34, according to the gaze 102. The occupancy probability 34 will be corrected by weighting it according to the value of the Gaussian function 40, which defines a gaze saliency map 26, which represents the probability of the gaze 102 being directed towards a certain location. The occupancy estimation application 14 is capable of finding or determining the value of the 2D Gaussian function 40 for each 3D voxel 34, as each voxel 34 is projected into a single 2D image space 38. After all updates are complete, a threshold 48 may be applied to the occupancy probability 36.

Figure 5:
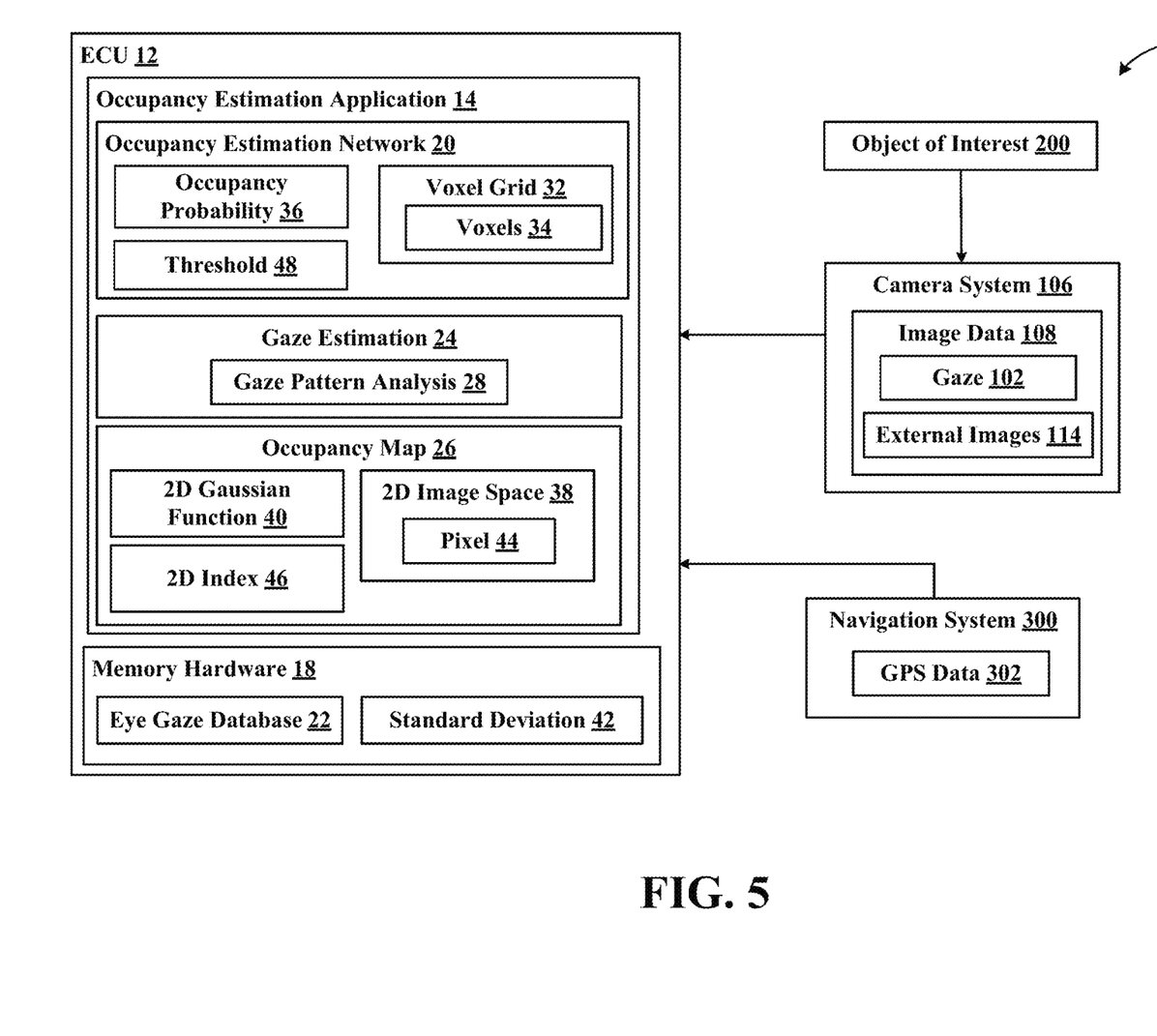
FIG. 5 is an exemplary block diagram of an occupancy estimation system according to the present disclosure, the occupancy estimation system including a gaze map.
Figure 6:
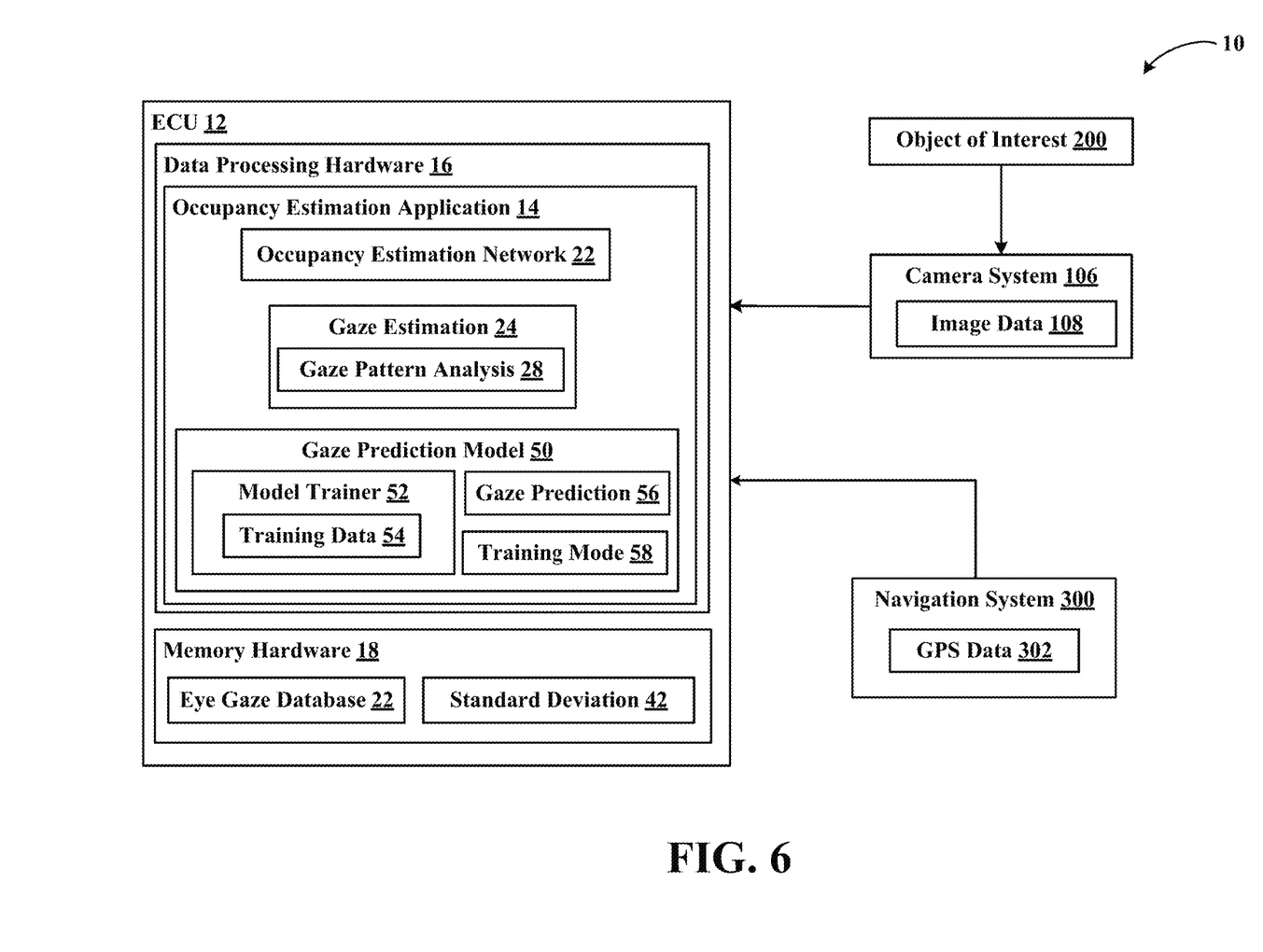
FIG. 6 is another exemplary block diagram of an occupancy estimation system according to the present disclosure, the occupancy estimation system including a gaze prediction model.

With reference now to FIGS. 5 and 6, the occupancy estimation application 14 may also include a gaze prediction model 50. The gaze prediction model 50 may be configured with a model trainer 52 configured to obtain training data 54 for training the gaze prediction model 50. The gaze prediction model 50 may be configured as a machine learning model, such that the model trainer 52 is configured to train the gaze prediction model 50 based on the training data 54. The model trainer 52 may retrieve the training data 54 from, for example, the eye gaze database 22, such that the training data 54 includes, but is not limited to, the stored gaze patterns 102a of historical gazes 102. The training data 54 may also include any other type of data that the gaze prediction model 50 is trained to receive. For example, the training data 54 may include stored image data 108. The gaze prediction model 50 is trained to predict a gaze 102 based on the training data 54. Thus, the gaze prediction model 50 is trained, in the event that the vehicle 100 is operating in an autonomous capacity, to output a gaze prediction 56 that is projected to correlate to the gaze 102 of the occupant 104 when the occupant 104 may be operating the vehicle 100. Thus, the occupancy estimation application 14 may rely on the eye gaze database 22 when executing the gaze prediction model 50 to output the gaze prediction 56.

The occupancy estimation application 14 may periodically enter a training mode 58. During the training mode 58, the occupancy estimation application 14 may be inoperable to predict the gaze 102, as the occupancy estimation application 14 is being trained by the model trainer 52 to better predict the gaze 102. As the gaze estimation 24 of the occupancy estimation application 14 is dependent upon the gaze 102, the gaze prediction model 50 effectively determines the predicted gaze 102 based on the eye gaze database 22 and image data 108 received from the camera system 106. In some examples, the occupancy estimation application 14 may execute the training mode 58 at intervals to periodically update the gaze saliency map 26 based on the training data 54 and, thus, the predicted gazes 102.

Figure 7:
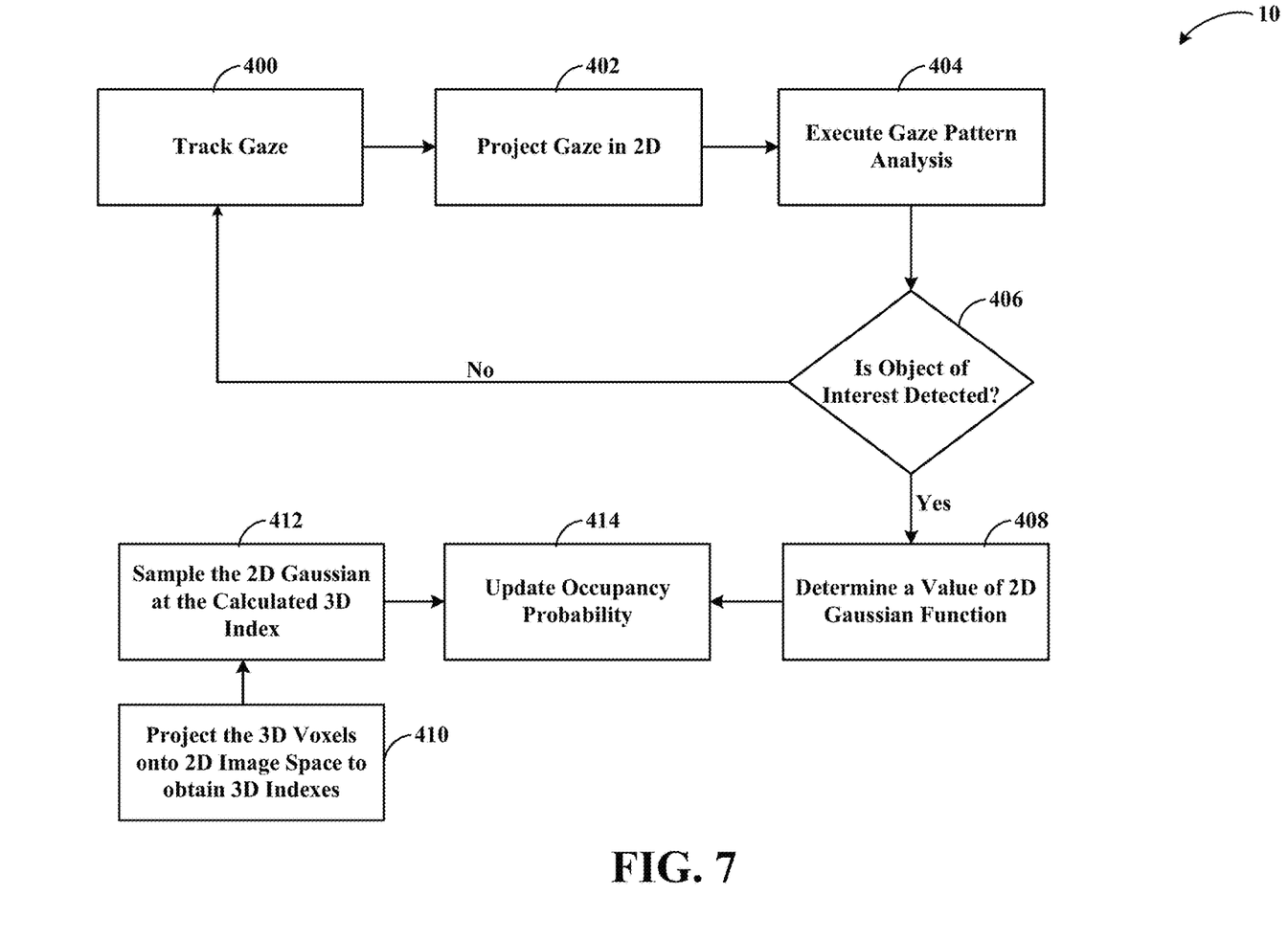
FIG. 7 is an exemplary flow diagram of an occupancy estimation system according to the present disclosure.
Figure 8:
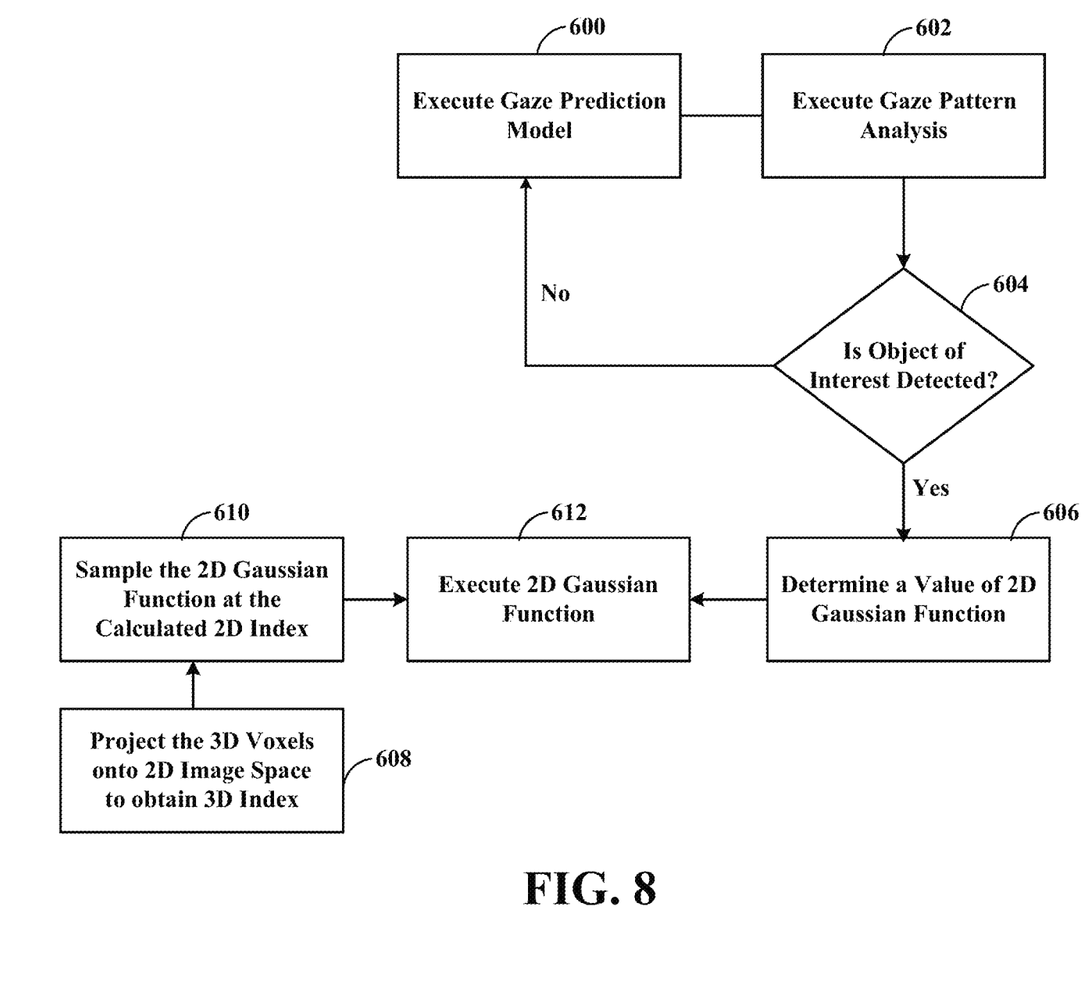
FIG. 8 is a further exemplary flow diagram of the occupancy estimation system.

Referring now to FIGS. 7-9, exemplary flow diagrams of the occupancy estimation system 10 are illustrated. In a first example, the occupancy estimation system 10 tracks, at 400, the gaze 102 and projects, at 402, the gaze 102 into two dimensions to identify the gaze direction 30. The occupancy estimation system 10 then executes, at 404, the gaze pattern analysis 28 using the gaze direction 30. The occupancy estimation system 10 also outputs, for the gaze pattern analysis 28, the updated occupancy probability After executing the gaze pattern analysis 28, the occupancy estimation system 10 determines, at 406 (FIG. 7), whether an object of interest 200 is detected. If not, then the occupancy estimation system 10 returns to tracking the gaze 102. If an object of interest 200 is detected, then the occupancy estimation system 10 determines, at 408, a value of the 2D Gaussian function 40. The occupancy estimation system 10 also projects, at 410, the 3D voxels 34 onto the 2D image space 38 to obtain the 2D index 36 and samples, at 412, the 2D Gaussian function 40 at the calculated 2D index 36. The occupancy estimation system 10 may then execute, at 414, the 2D Gaussian function 40, which may be used to update the occupancy probability 36.

In another example, the occupancy estimation system 10 executes, at 600, the gaze prediction model 50. The occupancy estimation system 10 may then execute, at 602, the gaze pattern analysis 28 and determine, at 604, whether an object of interest 200 is detected. If not, then the occupant estimation system 10 returns to executing the gaze prediction model 50. If an object of interest 200 is detected, then the occupancy estimation system 10 determines, at 606, a value of the 2D Gaussian function 40. The occupancy estimation system 10 projects, at 608, 3D voxels 34 onto the 2D image space 38 to get 3D indexes and samples, at 610, the 2D Gaussian function 40 at the calculated 2D index 46. The occupancy estimation system 10 may then update, at 612, the occupancy probability 36 by re-weighting according to the sampled value from the 2D Gaussian function 40.

Referring again to FIGS. 1-8, the occupancy estimation system 10 advantageously assists in predicting and estimating the occupancy probability 36 of an object of interest 200 based on the gaze 102 of an occupant. Further, the occupancy estimation system 10 may be advantageously used in autonomous vehicles 100 by using a gaze prediction model 50 trained on the eye gaze database 22 and configured to analyze the image data 108 received from the camera system 106. Thus, the gaze prediction model 50 may effectively provide the occupancy estimation system 10 with an automatic gaze estimation by training the gaze prediction model 50 to predict a gaze 102 in the absence of the gaze 102 of an occupant 104. The occupancy estimation system 10 ultimately provides an improved estimation of the likelihood of relevant objects 200 located far away from the vehicle 100.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed by data processing hardware causes the data processing hardware to perform operations comprising:
generating, at an occupancy estimation network, an occupancy probability at one or more voxels;
tracking, via a camera system, a gaze of an occupant;
identifying, based on the tracked gaze, an object of interest;
determining a gaze direction of the occupant based on one or more of the tracked gaze and the identified object of interest;
generating, via an occupancy estimation application, a gaze saliency map based on the gaze direction and identified object of interest; and
updating, based on the determined gaze direction and the gaze saliency map, the occupancy probability of the one or more voxels.

2. The method of claim 1, further including training, via a gaze prediction model, the occupancy estimation network.

3. The method of claim 1, wherein identifying the object of interest includes generating, via the occupancy estimation application, a two-dimensional Gaussian function on a two-dimensional image space of the gaze saliency map.

4. The method of claim 3, further including projecting, on the two-dimensional image space, the one or more voxels.

5. The method of claim 4, wherein updating the occupancy probability includes gathering, based on the projected one or more voxels, a two-dimensional index for each projected voxel.

6. The method of claim 5, further including applying a threshold to the updated occupancy probability.

7. The method of claim 1, wherein the gaze includes at least one of a smooth pursuit, a fixed gaze, and saccades.

8. A computer-implemented method when executed by data processing hardware causes the data processing hardware to perform operations comprising:
generating, at an occupancy estimation network, an occupancy probability at one or more voxels;
predicting, via a gaze prediction model, a gaze direction of a gaze prediction;
identifying, based on the predicted gaze direction, an object of interest;
generating, via an occupancy estimation application, a gaze saliency map based on the gaze direction of the gaze prediction and the identified object of interest; and
updating, based on the occupancy map and the gaze prediction, the occupancy probability of the one or more voxels.

9. The method of claim 8, further including training, via a model trainer of the gaze prediction model, the occupancy estimation network.

10. The method of claim 8, wherein identifying the object of interest includes generating, via the occupancy estimation application, a two-dimensional Gaussian function on a two-dimensional image space of the gaze saliency map.

11. The method of claim 10, further including projecting, on the two-dimensional image space, the one or more voxels.

12. The method of claim 11, wherein updating the occupancy probability includes gathering, based on the projected one or more voxels, a two-dimensional index for each projected voxel.

13. The method of claim 12, further including applying a threshold to the updated occupancy probability.

14. An occupancy estimation system for a vehicle, the occupancy estimation system comprising:
- data processing hardware; and
- memory hardware in communication with the data processing hardware, the memory hardware storing instructions that when executed on the data processing hardware cause the data processing hardware to perform operations comprising:
  - generating, at an occupancy estimation network, an occupancy probability at one or more voxels;
  - tracking, via a camera system, a gaze of an occupant;
  - identifying, based on the tracked gaze, an object of interest;
  - determining a gaze direction based on one or more of the tracked gaze and the identified object of interest;
  - generating, via an occupancy estimation application, a gaze saliency map based on the gaze direction and identified object of interest; and
  - updating, based on the determined gaze direction and the occupancy map, the occupancy probability of the one or more voxels.

15. The system of claim 14, further including training, via a gaze prediction model, the occupancy estimation network.

16. The system of claim 14, wherein identifying the object of interest includes generating, via the occupancy estimation application, a two-dimensional Gaussian function on a two-dimensional image space of the gaze saliency map.

17. The system of claim 16, further including projecting, on the two-dimensional image space, the one or more voxels.

18. The system of claim 17, wherein updating the occupancy probability includes gathering, based on the projected one or more voxels, a two-dimensional index for each projected voxel.

19. The system of claim 18, further including applying a threshold to the updated occupancy probability.

20. The system of claim 14, wherein the gaze includes at least one of a smooth pursuit, a fixed gaze, and saccades.

* * * * *